United States Patent
Kisel

(10) Patent No.: US 8,850,154 B2
(45) Date of Patent: Sep. 30, 2014

(54) PROCESSING SYSTEM HAVING MEMORY PARTITIONING

(75) Inventor: Michael Kisel, Stittsville (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 853 days.

(21) Appl. No.: 12/207,189

(22) Filed: Sep. 9, 2008

(65) Prior Publication Data

US 2009/0125700 A1 May 14, 2009

Related U.S. Application Data

(60) Provisional application No. 60/971,467, filed on Sep. 11, 2007.

(51) Int. Cl.
*G06F 12/12* (2006.01)

(52) U.S. Cl.
USPC ........... 711/170; 711/171; 711/173; 711/206; 718/104

(58) Field of Classification Search
CPC .......................... G06F 12/023; G06F 12/0253
USPC ................... 711/170, 206, 171, 173; 718/104
See application file for complete search history.

(56) References Cited

U.S. PATENT DOCUMENTS

| | | | |
|---|---|---|---|
| 4,238,746 A | 12/1980 | McCool et al. | |
| 4,282,405 A | 8/1981 | Taguchi | |
| 4,468,804 A | 8/1984 | Kates et al. | |
| 4,486,900 A | 12/1984 | Cox et al. | |
| 4,531,228 A | 7/1985 | Noso et al. | |
| 4,628,156 A | 12/1986 | Irvin | |
| 4,630,305 A | 12/1986 | Borth et al. | |
| 4,731,846 A | 3/1988 | Secrest et al. | |
| 4,791,390 A | 12/1988 | Harris et al. | |
| 4,811,404 A | 3/1989 | Vilmur et al. | |
| 4,843,562 A | 6/1989 | Kenyon et al. | |
| 4,939,685 A | 7/1990 | Feintuch | |
| 4,969,192 A | 11/1990 | Chen et al. | |
| 5,027,410 A | 6/1991 | Williamson et al. | |
| 5,056,150 A | 10/1991 | Yu et al. | |
| 5,146,539 A | 9/1992 | Doddington et al. | |
| 5,278,780 A | 1/1994 | Eguchi et al. | |
| 5,313,555 A | 5/1994 | Kamiya | |

(Continued)

FOREIGN PATENT DOCUMENTS

CA 2158847 9/1994
CA 2157496 10/1994

(Continued)

OTHER PUBLICATIONS

Anderson C.M., et al: "Adaptive Enhancement of Finite Bandwidth Signals in White Gaussian Noise," *IEEE Trans. on Acoustics, Speech and Signal Processing*, vol. ASSP-31, No. 1, Feb. 1983, pp. 17-28.

(Continued)

*Primary Examiner* — Jae Yu
(74) *Attorney, Agent, or Firm* — Brinks, Gilson & Lione

(57) ABSTRACT

Memory resource partitioning code allocates a memory partition in response to a process requesting access to memory storage. Memory partition rules may define attributes of the memory partition. The attributes may include a minimum memory allocation and a maximum memory allocation for the memory partition.

21 Claims, 10 Drawing Sheets

(56) References Cited

U.S. PATENT DOCUMENTS

| | | |
|---|---|---|
| 5,377,276 A | 12/1994 | Terai et al. |
| 5,400,409 A | 3/1995 | Linhard |
| 5,406,622 A | 4/1995 | Silverberg et al. |
| 5,408,581 A | 4/1995 | Suzuki et al. |
| 5,412,735 A | 5/1995 | Engebretson et al. |
| 5,432,859 A | 7/1995 | Yang et al. |
| 5,459,813 A | 10/1995 | Klayman |
| 5,473,702 A | 12/1995 | Yoshida et al. |
| 5,479,517 A | 12/1995 | Linhard |
| 5,494,886 A | 2/1996 | Kehne et al. |
| 5,495,415 A | 2/1996 | Ribbens et al. |
| 5,502,688 A | 3/1996 | Recchione et al. |
| 5,526,466 A | 6/1996 | Takizawa |
| 5,530,768 A | 6/1996 | Yoshizumi |
| 5,568,559 A | 10/1996 | Makino |
| 5,572,262 A | 11/1996 | Ghosh |
| 5,584,295 A | 12/1996 | Muller et al. |
| 5,590,241 A | 12/1996 | Park et al. |
| 5,615,298 A | 3/1997 | Chen |
| 5,617,508 A | 4/1997 | Reaves |
| 5,641,931 A | 6/1997 | Ogai et al. |
| 5,652,832 A | 7/1997 | Kane et al. |
| 5,677,987 A | 10/1997 | Seki et al. |
| 5,680,508 A | 10/1997 | Liu |
| 5,692,104 A | 11/1997 | Chow et al. |
| 5,701,344 A | 12/1997 | Wakui |
| 5,714,997 A | 2/1998 | Anderson |
| 5,737,719 A | 4/1998 | Terry |
| 5,742,694 A | 4/1998 | Eatwell |
| 5,812,844 A | 9/1998 | Jones et al. |
| 5,819,215 A | 10/1998 | Dobson et al. |
| 5,845,243 A | 12/1998 | Smart et al. |
| 5,920,840 A | 7/1999 | Satyamurti et al. |
| 5,920,848 A | 7/1999 | Schutzer et al. |
| 5,933,801 A | 8/1999 | Fink et al. |
| 5,949,886 A | 9/1999 | Nevins et al. |
| 5,949,888 A | 9/1999 | Gupta et al. |
| 5,953,694 A | 9/1999 | Pillekamp |
| 5,974,567 A * | 10/1999 | Dickson et al. ............ 714/27 |
| 6,011,853 A | 1/2000 | Koski et al. |
| 6,084,907 A | 7/2000 | Nagano et al. |
| 6,111,957 A | 8/2000 | Thomasson |
| 6,144,336 A | 11/2000 | Preston et al. |
| 6,163,608 A | 12/2000 | Romesburg et al. |
| 6,167,375 A | 12/2000 | Miseki et al. |
| 6,173,074 B1 | 1/2001 | Russo |
| 6,175,602 B1 | 1/2001 | Gustafsson et al. |
| 6,192,134 B1 | 2/2001 | White et al. |
| 6,199,035 B1 | 3/2001 | Lakaniemi et al. |
| 6,219,418 B1 | 4/2001 | Eriksson et al. |
| 6,249,275 B1 | 6/2001 | Kodama |
| 6,282,430 B1 | 8/2001 | Young |
| 6,285,979 B1 | 9/2001 | Ginzburg et al. |
| 6,405,168 B1 | 6/2002 | Bayya et al. |
| 6,408,273 B1 | 6/2002 | Quagliaro et al. |
| 6,434,246 B1 | 8/2002 | Kates et al. |
| 6,473,409 B1 | 10/2002 | Malvar |
| 6,493,338 B1 | 12/2002 | Preston et al. |
| 6,507,814 B1 | 1/2003 | Gao |
| 6,587,816 B1 | 7/2003 | Chazen et al. |
| 6,628,781 B1 | 9/2003 | Grundström et al. |
| 6,633,894 B1 | 10/2003 | Cole |
| 6,643,619 B1 | 11/2003 | Linhard et al. |
| 6,687,669 B1 | 2/2004 | Schrögmeier et al. |
| 6,690,681 B1 | 2/2004 | Preston et al. |
| 6,694,419 B1 * | 2/2004 | Schnee et al. ............ 711/173 |
| 6,725,190 B1 | 4/2004 | Chazan et al. |
| 6,732,073 B1 | 5/2004 | Kluender et al. |
| 6,771,629 B1 | 8/2004 | Preston et al. |
| 6,782,363 B2 | 8/2004 | Lee et al. |
| 6,804,640 B1 | 10/2004 | Weintraub et al. |
| 6,822,507 B2 | 11/2004 | Buchele |
| 6,836,761 B1 | 12/2004 | Kawashima et al. |
| 6,859,420 B1 | 2/2005 | Coney et al. |
| 6,871,176 B2 | 3/2005 | Choi et al. |
| 6,885,752 B1 | 4/2005 | Chabries et al. |
| 6,891,809 B1 | 5/2005 | Ciccone et al. |
| 6,898,293 B2 | 5/2005 | Kaulberg |
| 6,910,011 B1 | 6/2005 | Zakarauskas |
| 6,937,978 B2 | 8/2005 | Liu |
| 7,020,291 B2 | 3/2006 | Buck et al. |
| 7,117,149 B1 | 10/2006 | Zakarauskas |
| 7,146,012 B1 | 12/2006 | Belt et al. |
| 7,146,316 B2 | 12/2006 | Alves |
| 7,167,516 B1 | 1/2007 | He |
| 7,167,568 B2 | 1/2007 | Malvar et al. |
| 7,206,418 B2 | 4/2007 | Yang et al. |
| 7,222,345 B2 | 5/2007 | Gray et al. |
| 7,231,347 B2 | 6/2007 | Zakarauskas |
| 7,269,188 B2 | 9/2007 | Smith |
| 7,272,566 B2 | 9/2007 | Vinton |
| 7,346,569 B2 | 3/2008 | Oberuc |
| 7,406,522 B2 | 7/2008 | Riddle |
| 7,647,346 B2 | 1/2010 | Silverman et al. |
| 7,721,292 B2 | 5/2010 | Frasier et al. |
| 7,783,686 B2 | 8/2010 | Gates et al. |
| 2001/0005822 A1 | 6/2001 | Fujii et al. |
| 2001/0028713 A1 | 10/2001 | Walker |
| 2002/0007381 A1 * | 1/2002 | Bruckner ............ 707/531 |
| 2002/0052736 A1 | 5/2002 | Kim et al. |
| 2002/0071573 A1 | 6/2002 | Finn |
| 2002/0176589 A1 | 11/2002 | Buck et al. |
| 2002/0194251 A1 | 12/2002 | Richter et al. |
| 2003/0040908 A1 | 2/2003 | Yang et al. |
| 2003/0093265 A1 | 5/2003 | Xu et al. |
| 2003/0093270 A1 | 5/2003 | Domer |
| 2003/0097257 A1 | 5/2003 | Amada et al. |
| 2003/0101048 A1 | 5/2003 | Liu |
| 2003/0206640 A1 | 11/2003 | Malvar et al. |
| 2003/0216907 A1 | 11/2003 | Thomas |
| 2004/0002856 A1 | 1/2004 | Bhaskar et al. |
| 2004/0024600 A1 | 2/2004 | Hamza et al. |
| 2004/0071284 A1 | 4/2004 | Abutalebi et al. |
| 2004/0078200 A1 | 4/2004 | Alves |
| 2004/0138882 A1 | 7/2004 | Miyazawa |
| 2004/0165736 A1 | 8/2004 | Hetherington et al. |
| 2004/0167777 A1 | 8/2004 | Hetherington et al. |
| 2004/0179610 A1 | 9/2004 | Lu et al. |
| 2005/0075866 A1 | 4/2005 | Widrow |
| 2005/0097296 A1 * | 5/2005 | Chamberlain et al. ........ 711/170 |
| 2005/0111683 A1 | 5/2005 | Chabries et al. |
| 2005/0114128 A1 | 5/2005 | Hetherington et al. |
| 2005/0240401 A1 | 10/2005 | Ebenezer |
| 2006/0026598 A1 | 2/2006 | Handlogten et al. |
| 2006/0031672 A1 | 2/2006 | Soltis, Jr. et al. |
| 2006/0034447 A1 | 2/2006 | Alves et al. |
| 2006/0056502 A1 | 3/2006 | Callicotte |
| 2006/0074646 A1 | 4/2006 | Alves et al. |
| 2006/0089958 A1 | 4/2006 | Giesbrecht et al. |
| 2006/0089959 A1 | 4/2006 | Nongpiur et al. |
| 2006/0100868 A1 | 5/2006 | Hetherington et al. |
| 2006/0115095 A1 | 6/2006 | Giesbrecht et al. |
| 2006/0116873 A1 | 6/2006 | Hetherington et al. |
| 2006/0178972 A1 | 8/2006 | Jung et al. |
| 2006/0251268 A1 | 11/2006 | Hetherington et al. |
| 2006/0287859 A1 | 12/2006 | Hetherington et al. |
| 2007/0033031 A1 | 2/2007 | Zakarauskas |
| 2007/0136055 A1 | 6/2007 | Hetherington |
| 2007/0162909 A1 | 7/2007 | Bahl et al. |
| 2007/0245116 A1 * | 10/2007 | Yamamoto et al. ........... 711/172 |
| 2008/059971 A1 | 3/2008 | Abbey et al. |

FOREIGN PATENT DOCUMENTS

| | | |
|---|---|---|
| CA | 2158064 | 10/1994 |
| EP | 0 076 687 A1 | 4/1983 |
| EP | 0 275 416 | 7/1988 |
| EP | 0 558 312 A1 | 9/1993 |
| EP | 0 629 996 A2 | 12/1994 |
| EP | 0 629 996 A3 | 12/1994 |
| EP | 0 750 291 A1 | 12/1996 |
| EP | 0 948 237 A2 | 10/1999 |
| EP | 1 450 353 A1 | 8/2004 |
| EP | 1 450 354 A1 | 8/2004 |

(56) References Cited

FOREIGN PATENT DOCUMENTS

| EP | 1 669 983 A1 | 6/2006 |
|---|---|---|
| JP | 06269084 A2 | 9/1994 |
| JP | 06319193 A | 11/1994 |
| WO | WO 0041169 A1 | 7/2000 |
| WO | WO 0156255 A1 | 8/2001 |
| WO | WO 0173761 A1 | 10/2001 |
| WO | WO 2006/130668 | 12/2006 |

OTHER PUBLICATIONS

Avendano, C. et al., "Study on the Dereverberation of Speech Based on Temporal Envelope Filtering," Proc. ICSLP '96, Oct. 1996, pp. 889-892.

Berk et al., "Data Analysis with Microsoft Excel," Duxbury Press, 1998, pp. 236-239 and 256-259.

Bilcu, R.C. et al., "A New Variable Length LMS Algorithm: Theoretical Analysis and Implementations," 2002, IEEE, pp. 1031-1034.

Byun K.J., et al: "Noise Whitening-Based Pitch Detection for Speech Highly Corrupted by Colored Noise," *ETRI Journal*, vol. 25, No. 1, Feb. 2003, pp. 49-51.

Campbell D.A., et al: "Dynamic Weight Leakage for LMS Adaptive Linear Predictors," *Tencon '96 Proceedings*, 1996 IEEE Tencon Digital Signal Processing Applications Perth, WA, Australia Nov. 26-29, 1996, NY, NY, USA, IEEE, US, vol. 2, Nov. 26, 1996, pp. 574-579.

Chang J.H., et al: "Pitch Estimation of Speech Signal Based on Adaptive Lattice Notch Filter," *Signal Processing*, Elsevier Science Publishers B.V. Amsterdam, NL, vol. 85, No. 3, Mar. 2005, pp. 637-641.

Fiori, S. et al., "Blind Deconvolution by Modified Bussgang Algorithm," Dept. of Electronics and Automatics—University of Ancona (Italy), ISCAS 1999, 4 pages.

Kang, Hae-Dong; "Voice Enhancement Using a Single Input Adaptive Noise Elimination Technique Having a Recursive Time-Delay Estimator," Kyungbook National University (Korea), Doctoral Thesis, Dec. 31, 1993, pp. 11-26.

Kauppinen, I., "Methods for Detecting Impulsive Noise in Speech and Audio Signals," 2002, IEEE, pp. 967-970.

Koike, S., "Adaptive Threshold Nonlinear Algorithm for Adaptive Filters with Robustness Against Impulse Noise," 1996, IEEE, NEC Corporation, Tokyo 108-01, pp. 1644-1647.

Learned, R.E. et al., A Wavelet Packet Approach to Transient Signal Classification, Applied and Computational Harmonic Analysis, 1995, pp. 265-278.

Nakatani, T., Miyoshi, M., and Kinoshita, K., "Implementation and Effects of Single Channel Dereverberation Based on the Harmonic Structure of Speech," Proc. of IWAENC-2003, Sep. 2003, pp. 91-94.

Nascimento, V.H., "Improving the Initial Convergence of Adaptive Filters: Variable-Length LMS Algorithms," 2002 IEEE, pp. 667-670.

Pornimitkul, P. et al., 2102797 Statistic Digital Signal Processing, Comparison of NLMS and RLS for Acoustic Echo Cancellation (AEC) and White Gaussian Noise (WGN), Department of Electrical Engineering Faculty of Engineering, Chulalongkorn University, 2002, pp. 1-19.

Puder, H. et al., "Improved Noise Reduction for Hands-Free Car Phones Utilizing Information on a Vehicle and Engine Speeds," Signal Theory, Darmstadt University of Technology, 2000, pp. 1851-1854.

Quatieri, T.F. et al., "Noise Reduction Using a Soft-Decision Sine-Wave Vector Quantizer," International Conference on Acoustics, Speech & Signal Processing, 1990, pp. 821-824.

Quelavoine, R. et al., "Transients Recognition in Underwater Acoustic with Multilayer Neural Networks," Engineering Benefits from Neural Networks, Proceedings of the International Conference EANN 1998, Gibraltar, Jun. 10-12, 1998 pp. 330-333.

Rabiner L.R., et al: "A Comparative Performance Study of Several Pitch Detection Algorithms," *IEEE Trans. on Acoustics, Speech and Signal Processing*, vol. ASSP-24, No. 5, Oct. 1976, pp. 399-418.

Sasaoka N, et al: "A New Noise Reduction System Based on ALE and Noise Reconstruction Filter," *Circuits and Systems*, 2005. ISCAS 2005. IEEE International Symposium on Kobe, Japan May 23-26, 2005, Piscataway, NJ USA, IEEE May 23, 2005, pp. 272-275.

Seely, S., "An Introduction to Engineering Systems," Pergamon Press Inc., 1972, pp. 7-10.

Shust, M.R. et al., "Electronic Removal of Outdoor Microphone Wind Noise," obtained from the Internet on Oct. 5, 2006 at: <http://www.acoustics.org/press/136th/mshust.htm>, 6 pages.

Shust, M.R., Abstract of "Active Removal of Wind Noise From Outdoor Microphones Using Local Velocity Measurements," *J. Acoust. Soc. Am.*, vol. 104, No. 3, Pt 2, 1998, 1 page.

Simon, G., "Detection of Harmonic Burst Signals," International Journal Circuit Theory and Applications, Jul. 1985, vol. 13, No. 3, pp. 195-201.

Tam, K. et al., "Highly Oversampled Subband Adaptive Filters for Noise Cancellation on a Low-resource DSP System," Proc. of Int. Conf. on Spoken Language Processing (ICSLP), Sep. 2002, pp. 1-4.

Vaseghi, S. et al., "The Effects of Non-Stationary Signal Characteristics on the Performance of Adaptive Audio Restoration System," 1989, IEEE, pp. 377-380.

Vieira, J., "Automatic Estimation of Reverberation Time," Audio Engineering Society, Convention Paper 6107, 116th Convention, May 8-11, 2004, Berlin, Germany, pp. 1-7.

Wahab A. et al., "Intelligent Dashboard With Speech Enhancement," Information, Communications, and Signal Processing, 1997. ICICS, Proceedings of 1997 International Conference on Singapore, Sep. 9-12, 1997, New York, NY, USA, IEEE, pp. 993-997.

Widrow, B. et al., "Adaptive Noise Cancelling: Principles and Applications," 1975, IEEE, vol. 63, No. 13, New York, pp. 1692-1716.

Zakarauskas, P., "Detection and Localization of Nondeterministic Transients in Time series and Application to Ice-Cracking Sound," Digital Signal Processing, 1993, vol. 3, No. 1, pp. 36-45.

\* cited by examiner

PROCESSING SYSTEM HAVING MEMORY PARTITIONING

PRIORITY CLAIM

This application claims the benefit of priority from U.S. Provisional Application No. 60/971,467, filed Sep. 11, 2007, which is incorporated by reference.

BACKGROUND OF THE INVENTION

1. Technical Field

This invention relates generally to the field of memory resource management, and in particular, to a system that manages and manages memory resources in a processing system.

2. Related Art

Computers, embedded controllers, and other processing systems may include a number of finite resources. Such resources may include communication bandwidth resources, interrupt handling resources, mutual exclusion algorithms, semaphores, and other resources. The management of such allocatable resources may have an impact on the operation and/or efficiency of the processing system.

Some resource memory management approaches may implement a rigid partitioning scheme. In a rigid memory partitioning scheme, a memory resource may be divided into fixed-size chunks. A finite amount of the memory resource may be reserved to make that finite amount unavailable to other entities in a processing system. Processes may reserve portions of memory that the process never uses. This may cause a lack of free memory that blocks or delays other processes. Other memory resource management techniques may be inefficient and may reserve resources on a first-come, first-served basis without regard for the operation of the processing system.

SUMMARY

Memory resource partitioning code allocates a memory partition in response to a process requesting access to memory storage. Memory partition rules may define attributes of the memory partition. The attributes may include a minimum memory allocation and a maximum memory allocation for the memory partition.

Other systems, methods, features, and advantages of the inventions will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
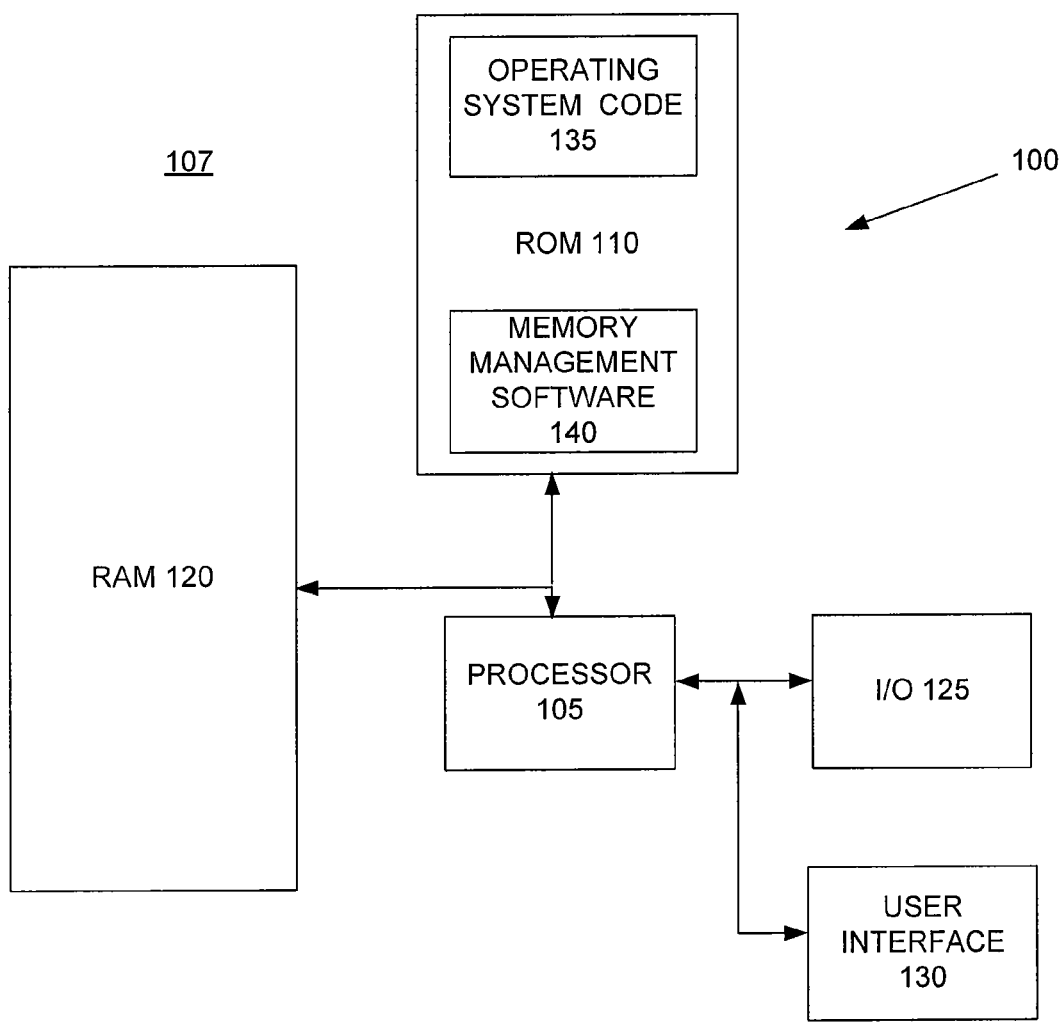
FIG. 1 is a processing system.

FIG. 1 is a processing system 100 that may include a processor 105 and memory storage 107. Memory storage 107 may be local memory, network memory, a distributed memory, or and other memory type. Memory storage 107 may include read only memory (ROM) 110 and/or random access memory (RAM) 120. Processing system 100 may communicate through an I/O interface 125 and/or a user interface 130. The read only memory 110 may retain operating system code 135 that may control the interaction between application programs executed by the processor 105 and hardware components, including memory devices 110 and 120 and the interface devices 125 and 130. The operating system code 135 may include memory management software 140 that organizes and controls access to data stored in the random access memory 120. The memory management software 140 may include code for interacting with a memory management unit. Alternatively, or in addition, the memory management software 140 may be stored in a separate medium remote from the operating system code 135. The memory management software 140 may be stored in read only memory 110, a persistent storage medium, or in other storage medium. When the processing system 100 is linked with other computers and/or storage devices through I/O interface 125, the memory management software 140 may be downloaded to the processing system 100 from one or more of the other computers and/or storage devices. FIG. 1 shows storage of the memory management software 140 in read only memory 110.

Figure 2:
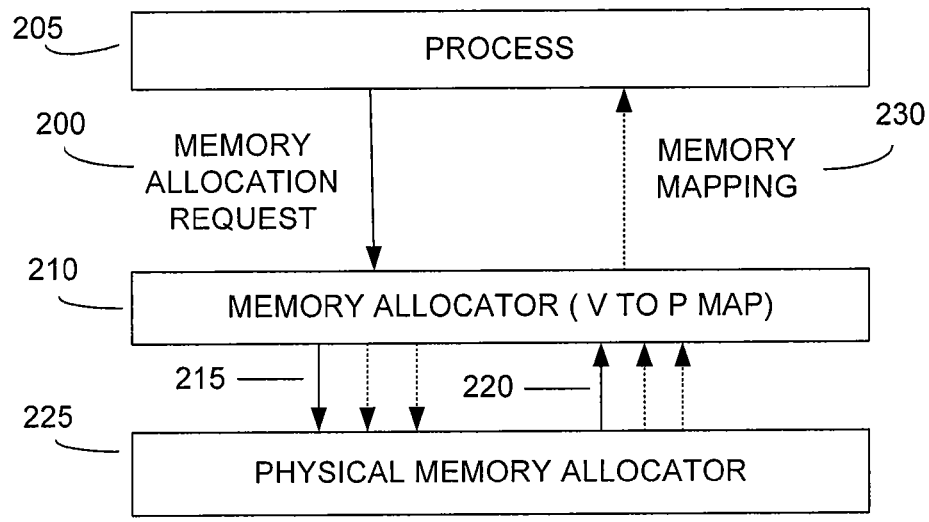
FIG. 2 shows communications between a process and a memory resource allocator.

The system of FIG. 2 may manage memory. In FIG. 2, requests for memory 200 may be issued by software applications, processes, and/or an operating system kernel, e.g. process 205. The memory request may be passed to a memory allocator 210. The memory allocator 210 may assign virtual memory locations to the data stored in the physical memory. Data and/or executable code may be stored contiguously, e.g. in successive memory locations. If large blocks of contiguous physical memory are not available, the system may assign virtual memory locations which are contiguous. This may cause the memory allocator 210 to associate fragmented physical memory locations 215, 220 with the virtual memory locations. The memory allocator 210 may document the mappings to the physical memory so that the system 100 may handle the data and/or executable code as if it was in contiguous memory locations. A physical memory allocator 225 may track which process or entity is using which physical memory to prevent the physical memory allocator 225 from allocating a physical memory space to more than one process. Physical memory allocator 225 may also track which memory is free and which memory is used by which process. Further, the physical memory allocator 225 may respond to a condition in which a process is no longer using a specific memory region by designating the specific memory region as "free" memory. This "free" memory may be allocated to other processes at a later time.

The memory allocator 210 may provide virtual to physical memory mappings 230 to software applications, processes, or kernel, e.g. the process 205. Alternatively, or in addition, the memory allocator 210 may program a memory management unit or similar memory manager with the virtual-to-physical mappings so that memory operations are performed on the correct physical memory storage locations.

Figure 3:
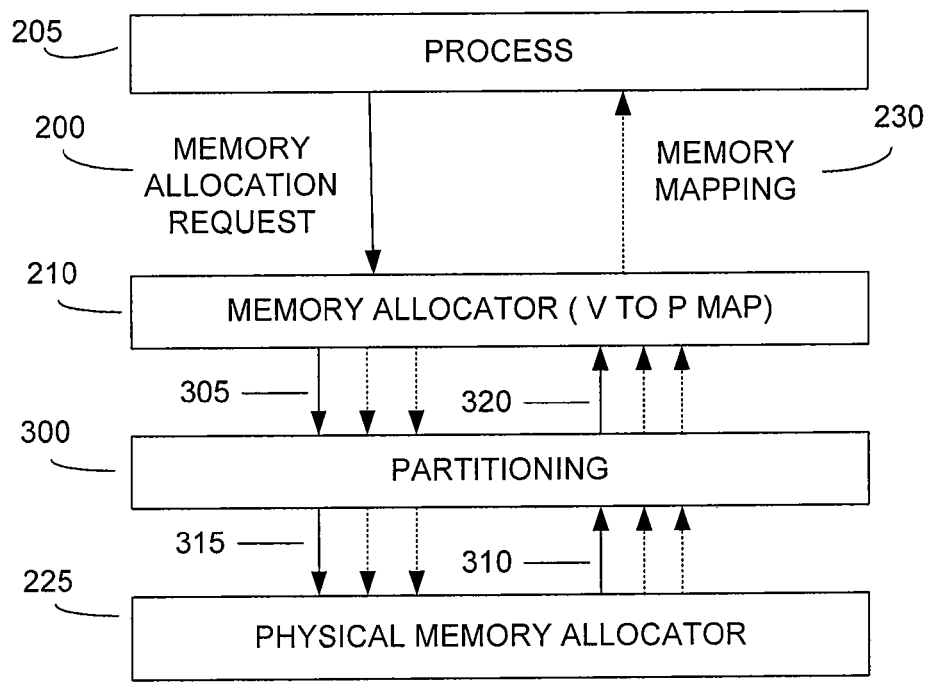
FIG. 3 shows communications between a process and a memory resource allocator through a memory resource partitioner.

FIG. 3 is a memory management system that uses memory partitioning to manage memory. A partitioning module 300 arbitrates communications between the memory allocator 210 and the physical memory allocator 225. The partitioning module 300 may intercept one or more memory operation requests 305 and may process them before they are transferred to the physical memory allocator 225. The partitioning module 300 may also intercept physical memory block identifiers 310 returned by the physical memory allocator 225. The partitioning module 300 may manipulate memory block identifiers before transmitting them to the memory allocator 210. Communications 305, 310, 315, and 320 are represented by multiple broken lines to illustrate how the memory allocator 210 may make multiple requests to the physical memory allocator 225 for portions of the original allocation request 200. The memory allocator 210 may construct memory mappings to allocate a contiguous virtual memory address range 230 for use by the requesting entity, e.g., process 205.

The partitioning module 300 may define and manage memory classes and partitions of these memory classes with respect to requested memory operations. The partitioning module 300 may also set the minimum and maximum sizes for those partitions as well as other parameters and properties for those partitions.

Processes or other entities may create objects. The class of memory that one object uses may be different than the class of memory for another object. Two different processes may also have identical objects created from different memory classes. Different classes of memory (e.g., memory with different attributes) may be independently partitioned. If a particular process/entity uses a particular class of memory, that process/entity may be associated with a partition of that class, independent of the memory class requirements of other processes/entities. When partitioning memory, each memory class may be partitioned independently. A memory partition may represent a single class of memory. If a process/entity creates objects that require different classes of memory, the process/entity may be associated with multiple partitions.

Memory partitions of a given memory class may nest. Newly created memory partitions may subdivide a parent memory partition and form a hierarchy. In this architecture child partitions may be constrained by the attributes of their parent partition. Alternatively, or in addition, a system may partition a particular memory class so that it is not completely bound by the parent attributes.

Accounting operations may be executed independently for each partition of an associated memory class. The memory partitioning system may support the enforcement of partitioning rules based on the attributes established on a per memory class basis, even if only one memory class, system memory, is utilized.

The memory partitioning system facilitates establishment of memory classes that may distinguish between different levels of importance or costs of different kinds of memory resources. Memory compatible with DMA may be distinguished from memory that is not compatible with DMA. Although DMA compatible memory may be allocated for general use by all processes, it may be undesirable to allocate all of the DMA-capable memory for general use. By partitioning different memory resource classes separately, and by allowing one process/entity to be associated with more than one memory resource partition, memory resource requirements for DMA compatible memory, DMA incompatible memory, and/or other memory resource classes may be met.

Memory Partition Attributes and Policies

A partition may be an entity that represents the attributes and rules which govern the use of a resource. Memory partitions may have the following configurable attributes:

i. minimum size (guarantee); the minimum size attribute specifies the amount of a particular class of memory that has been reserved for exclusive use for objects which are associated with the partition; and ii. maximum size (restriction); the maximum size attribute specifies the amount of a particular class of memory that may never be exceeded for use by objects that are associated with the partition.

Some characteristics that may emerge as a result of these attributes may include:

i. Reserved Memory a non-zero minimum value represents a reservation and not an allocation. When a non-zero minimum value is successfully configured for a partition, the memory may be reserved for exclusive use by that partition in the allocator for that memory class, although it may not be pre-allocated in some applications; and allocations made against partitions with reservations may be accounted against unused reservations first and against available discretionary memory second;

ii. Discretionary Memory the difference between the maximum and minimum values for a partition may represent the amount of discretionary memory of that class available for the creation of objects associated with the partition and may be zero; and access to discretionary memory may be dependent upon system partition configuration and may not necessarily guarantee availability.

The memory partitioning system may enforce a rule in which the sum of the minimum values of the partitions is less than or equal to the total memory of the system. This constraint may be used so that a minimum amount of memory will be available to all processes/entities. Allocation in a child partition may be counted as an allocation in the parent. When a child partition is created with a reservation, that reservation may be treated as an allocation request to the parent. The reservation request may propagate up the hierarchy as far as required until the request is either wholly satisfied by the existing reservation of a parent, and/or by the allocator of the memory class.

Memory Partition Types

The attributes and rules that may be associated with the creation a memory partition are generally unlimited. Memory partition configurations or use cases may include:

1. Open; minimum=0, maximum=no limit; discretionary only memory allocations made for objects associated with this partition type are subject to the availability of discretionary memory. There is no limit (beyond the limit of physical memory available to the memory allocator 210 for that class) to the amount of memory that may be requested. Allocations made for objects associated with this partition may not succeed. This configuration type may create an environment similar to the case when there is no memory partitioning. If memory is available, the allocation request will succeed (notwithstanding factors unrelated to availability), otherwise it will fail 2. Guarantee; minimum=N, maximum=no limit, reserved+discretionary; N bytes of the respective memory class are reserved and available for allocation to objects associated with the partition. There is no limit (beyond the limit of physical memory available to the memory allocator 210 of that class) to the amount of memory that may be requested. This configuration type may be used when objects associated with this partition require a specific amount of memory. Further memory requirements may be governed by the rules for discretionary memory allocations.

3. Restricted; minimum=0, maximum=N, discretionary only; memory allocations made for objects associated with this partition type are subject to the availability of discretionary memory and may not exceed the limit of N bytes. This configuration type may be used when the memory requirements for the objects associated with the partition are not known and the N bytes limit may not be exceeded.

4. Sandbox; minimum=N, maximum=N, reserved only; N bytes, and only N bytes of the respective memory class is reserved and available for allocation to objects associated with the partition. This configuration type may be used when the memory requirements for the objects associated with the partition are known, or for situations where a course subdivision of the available memory class is desired. The configuration may allocate memory blocks for further subdivision by others (using any partition configuration including the defined partition configurations described above).

Additional configurations may also be used that are unique or combine one or more of these configurations. For example, a configuration may combine the guarantee and restricted partition types. This configuration may specify a reserved amount, while allowing for a "not to exceed" buffer of discretionary allocation. This configuration may also be used to assist in optimizing a sandbox partition and/or for accommodating transient memory allocations in a guarantee partition.

Memory partitions may be established at run time or at the time a bootable image is built using run-time APIs and/or build-time tools. Memory partitions may also be changed at runtime. An "open" partition may be dynamically changed to a "closed" partition when a user changes the minimum and/or maximum values at run time.

Memory Classes

Memory partitioning may be performed on a per memory class basis. Memory classes may be system specific. A memory class that may be present and automatically configured may be the system RAM class.

A memory class need not refer to a physical block of memory. Different classes of memory may reside in separate physical blocks. Memory partitioning need not impose any particular attributes to the use of individual memory classes. The suitability of a particular class of memory to a particular use is not necessarily within the domain of the memory partitioning system. Rather, predetermined memory class configurations may be used while the memory partitioning system manages memory in accordance with the attributes of memory classes.

Memory classes may be provided to the memory partitioning system through pre-configured system configuration information. This information may be established at build time and may be available after boot-time. It may be provided as BIOS information on x86 systems. In the case of QNX® Neutrno® operating system, the memory classes may be made available to the memory partitioning system at startup using a system page. The memory classes may be available for partitioning when they are introduced into a partitioning name space or under whatever path root is used in the system. On a QNX Neutrino operating system, partitionable memory resources may be exposed under the /partition/<resource> name space. Memory partitioning may use a POSIX namespace to represent the naming of partitions and their hierarchical relationships. This may provide access to usage statistics, configuration options, and other features offered by the memory partitioning system.

On non-POSIX systems, memory partitions may use a portion of the system's name space that is used in that system. On systems which do not have a name space, a memory resource partition may create its own name space.

Using a name space for access to the memory partitioning module may provide the following:
- access control through POSIX permissions (or on non-POSIX systems, whatever permission control is used on members of the path name space);
- the ability to view and manipulate partition topology using utilities (e.g., on POSIX systems, ls, mkdir, and rm); and
- use of POSIX API's such as open( ), close( ) and ioctl( )—(or on non-POSIX systems whatever APIs are used on members of the path name space).

Before a memory class is partitioned, the memory class may be added to the memory partitioning system by creating a new entry in the system name space using the memory class name as registered in the system page (in the case of a QNX system). In other implementations, a name may be created that corresponds to the particular operating system that is used to implement the memory partitioning system. Systems that do not have a name space may use an alternative mechanism for exposing the memory partitioning module.

Since partitioning may take place on a per memory class basis, a partition may be created in the name space under the respective memory class. A partition of the system memory class, such as a system partition, may be created by default. The system partition may be used to account for all memory allocations that are allocated to user processes, including kernel allocations done on behalf of user processes, which are not otherwise associated with a different partition. If additional partitions are not created, all allocations may be accounted to the system partition.

Memory Partition Configurations

A certain amount of system RAM may be used during startup and/or for use by the kernel. The size of the system partition after startup may determine what memory is available for partitioning. The system partition may be created as an Open partition type by default, but may be configured as a Guarantee partition at the time the bootable image for the system is built. The system partition may be used as the root of a memory partition hierarchy. If the system partition is used as the root partition of a hierarchy, however, it may not necessarily protect software such as the operating system kernel that should receive guaranteed memory from the system partition.

Partition topologies may be flat, in which all partitions are root partitions, or hierarchical, in which at least one root partition exists with one or more child partitions beneath it. In a flat topology, the attributes specified for a memory partition may be independent of the attributes of any other memory partition. Memory partitions of any configuration may be created so long as general rules for creation are satisfied. For example, an application may not create five 32 MB sandbox partitions of the same memory class when only 128 MB of physical memory is available in that class.

In a hierarchical topology, some of the attributes specified for a child partition may be dependent on the attributes of its parent. The memory partition hierarchy may include a rule of subdivision where:

when a partition is created as the child of an existing partition, a non-zero minimum configured in the child is accounted as an allocation to the parent partition. This means that if the parent partition has any unallocated reserved memory, it may be used to satisfy some or all of the child reservation. This reservation is accounted up the entire partition hierarchy until it is fully accounted for in either a parent partition or some combination of parent partitions and the allocator for the class; and when an allocation is made for memory in a child partition, the allocation may be accounted for in the memory partition hierarchy. Enough "free space" should exist in the memory partition hierarchy for an allocation to succeed.

Partition rules may govern whether the allocation of memory will be allowed to proceed. There are reasons unrelated to availability of memory which may prevent the memory allocator for a given class of memory from satisfying an allocation request. Assuming a request for a contiguous block of physical memory does not exceed the size rules for the memory partition class, internal fragmentation of the physical memory may prevent the memory allocator for the memory class from creating the memory partition.

The rules governing the use of memory class attributes may include:

the maximum size attribute is always >=the minimum size attribute;

the minimum/maximum size attributes have a range from 0> unlimited; and minimum and maximum values can be modified subject to these size attribute rules.

Pseudo Partitions/Partition Groups

A real partition represents a real partition of a memory class. Pseudo partitions and partition group names provide a means of grouping real partitions. A real memory partition may be a memory partition with attributes and policies that reference an actual memory resource. A group name may be used as a pseudo partition that references a collection of real memory partitions. A group name may be an alias for a real memory partition. A process need not be directly associated with all of the memory partitions for each memory class it uses. Group names may simplify process associations by allowing a process to be associated with a single group name and, by extension, to a collection of real partitions through their respective pseudo partitions. Pseudo partitions may also link differing memory resource types through a common group name.

Process Association with Memory Partitions

When a process is created, optional parameters to posix_spawn( ), or whatever process spawning primitive the operating system provides, may allow the spawned process to be associated with a corresponding memory partition(s). If nothing is specified, the spawned process may be associated with the same partition(s) as those of the requesting process. A forked process may be associated with the same partition(s) as the parent.

A process may call an API to associate itself with one or more memory partitions, (e.g. self-initiated). Additionally, or in the alternative, a system application may utilize an API to effect associations for other processes without coordinating with those processes and/or without awareness by those processes that such associations have been effected on their behalf. Restrictions may be used to inhibit incorrect configurations when using pseudo and real partition associations to allocate memory to the same process. These restrictions may prevent an undesirable association between the process and memory partitions.

Memory Partition Metrics

In operating systems which support a name space, such as the QNX Neutrino operating system and other POSIX supported operating systems, use of the path name space may be used to obtain memory partition metrics. This may facilitate the use of POSIX commands, like "ls" and "cat", as well as the creation of custom applications, to obtain and display memory partition and memory class data. Such information may include current memory usages and configurations. Memory partition metrics may facilitate user specified partitioning of the available system memory. The metrics may account for a memory partition usage. Applications may retrieve information that includes:

current configuration (attributes and policies);

creation configuration (attributes and policies at the time the partition was created);

current memory used in that partition; and/or highest partition usage size.

Similar information may be made available for a memory class as a whole.

Memory Partition Events

A process may be identical to another process in which no memory partitioning is used. A privileged process may register so that it is notified for various memory class and partition events. Notification may occur by a message or signal that may be provided to a designated thread of the registered process. This notification may be facilitated by inter-process communication and/or thread synchronization primitives supported by the system. When a process attempts to execute memory operations, corresponding events may be generated. These events may include:

size change events (including threshold crossing and delta change);

configuration change events (including failed attempts);

process association and disassociation events (including failed attempts); and/or child partition creation and destruction events (including failed attempts).

Security Issues

Security issues may include deciding what software you trust and may be a concern when configuring memory partitions. In some instances, security issues may be an exclusive or non-exclusive reason for use of the memory partitioning system. The memory partitioning system may support security policies that may include:

Configuration Security:

the ability to prevent partition topology changes;

the ability to prevent partition destruction;

the ability to prevent illegal partition creation; and/or the ability the prevent partition configuration changes.

Operational Security:

the ability to ensure that guarantees are provided;

the ability to ensure that restrictions are enforced; and/or the ability to ensure that only authorized processes can be associated with partitions.

The following mechanisms may affect the security policies:

1. Terminal Partition Policy—a terminal partition policy may allow a given partition to be configured (independently of other partitions) to inhibit creation of child partitions. The memory partitioning system may prevent this policy from changing once set to TRUE. Although this policy may prevent the creation of child partitions it need not prevent the changing of partition attributes. This policy may be used to inhibit a hierarchical explosion of partitions while allowing attribute modification (if appropriately privileged).

2. Configuration Lock Policy—the configuration lock policy may allow all configuration attributes of a partition to be locked. The memory partitioning system may prevent this policy from changing once set to TRUE. This mechanism may prevent changes to the memory partition attributes, including POSIX file permissions. It may allow, however, the creation of child partitions so that a locked down parent partition may be independently sub-partitioned by a separate (appropriately privileged) organization.

3. Permanence Policy—the permanence policy may prevent the destruction of a partition. The memory partitioning system may prevent this policy from changing once set to TRUE. This mechanism may prevent the removal of a memory partition independent of POSIX file permissions.

4. POSIX permissions may be used to control whether a process may associate with a memory partition and whether it may modify or examine the policies and/or attributes of the memory partition.

Figure 4:
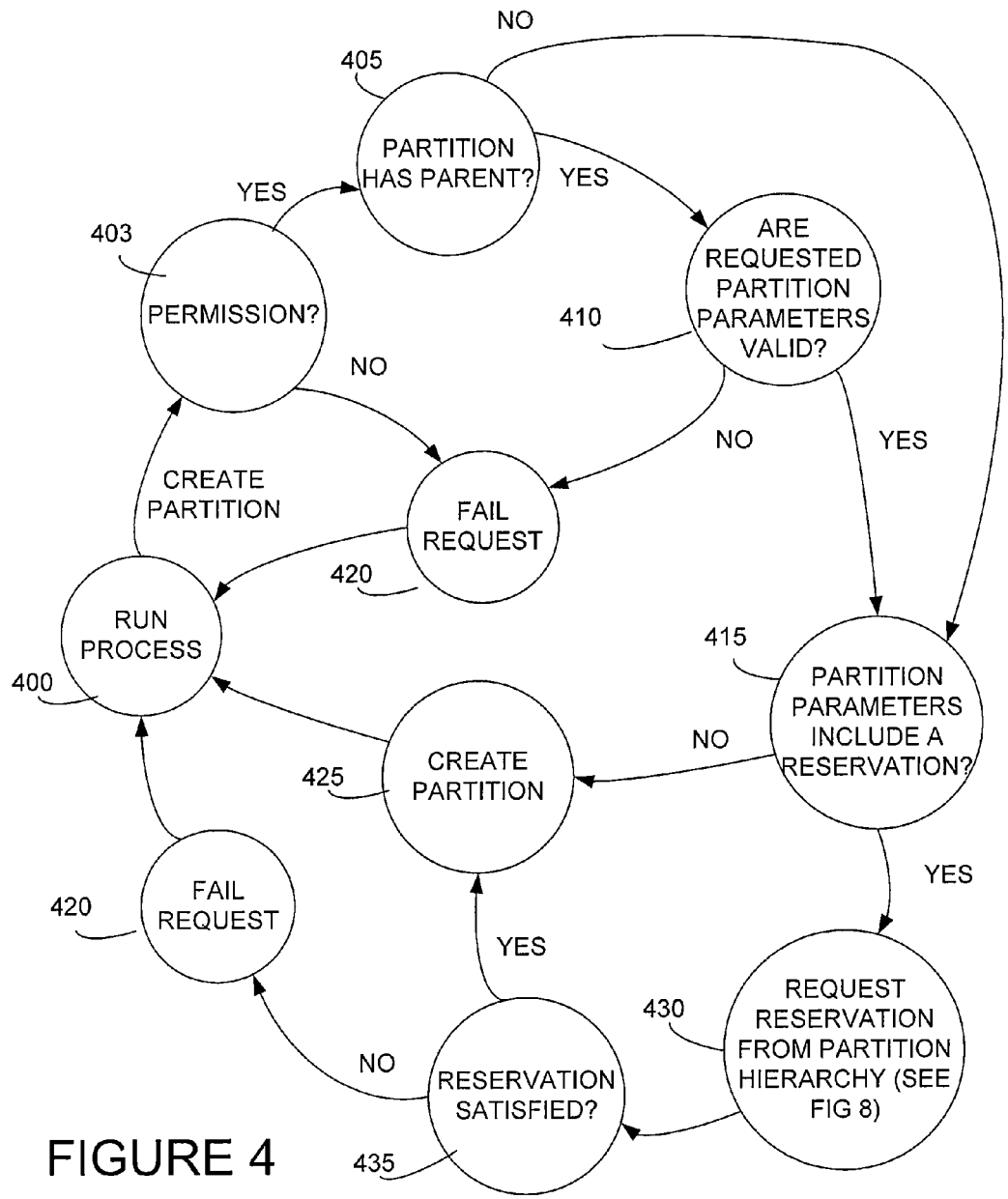
FIG. 4 is a process that partitions memory.

FIG. 4 shows a process that creates a memory partition. The process may be initiated at 400. The partitioning module 300 may determine whether the process has the authorization or permission to create the partition at 403. If authorization is not received, then the request may fail at 420, and control may return to the running process at 400. If the process does have permission to create a partition, then the process determines at 405 whether the requested memory partition has a parent. If the memory partition does not have a parent, the memory partition may be a root partition, and control may pass to 415. If the partition has a parent, then the process determines whether the requested partition parameters are valid at 410 by inspecting the partition hierarchy in which the new partition is being created. If the configuration parameters are not valid, then the partition request fails at 420. A notification of this events may be issued on failure, or control may be returned to the requesting process either for another attempt or to abandon the attempt.

If the requested partition parameters are valid, then the process determines whether the partition parameters include a memory reservation at 415. If not, then a memory partition may be created at 425. If the partition parameters include a reservation, then a reservation may be requested from the partition hierarchy, if one exists. The request may propagate through the hierarchy until it is satisfied by one or more parent partitions and/or from the memory allocator for the memory class at 430. If the new partition is a root partition (no hierarchy) the request may be sent to the memory partition allocator for the memory class. In either case, if the reservation is satisfied at 435, then the memory partition may be created at 425 and control may return to the requesting process. If the reservation is not satisfied, then the request may fail 420.

Figure 5:
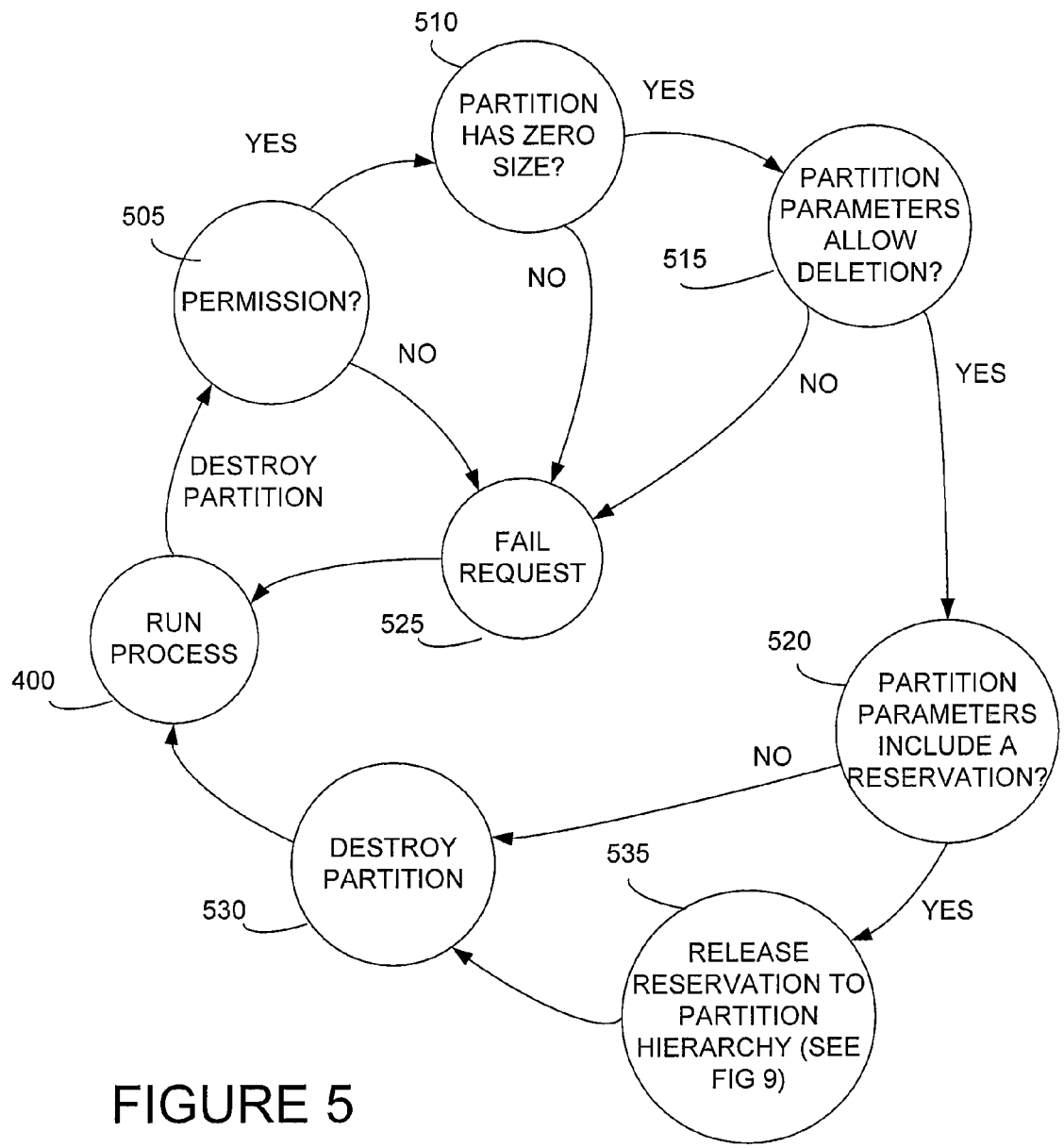
FIG. 5 is a process that removes a memory partition.

FIG. 5 is a process that removes a memory partition. When a software process 400 requests removal of a partition, the partitioning module 300 may determine whether the process has authorization or permission to remove the partition at 505. If not, then a fail request may be issued at 525, and control may return to the running process at 400. If the process has permission to remove a partition, then it may determine whether the size of the identified memory partition is zero at 510. If it is not, then the request may fail state 525. If the size of the memory partition is zero, then control may pass to 515, where the process may determine whether the partition parameters allow deletion. A partition will not have a zero size if there are any processes or memory objects still associated with it. Before a partition may be removed, the corresponding processes may be disassociated from it and the objects created by those processes destroyed.

Figure 9:
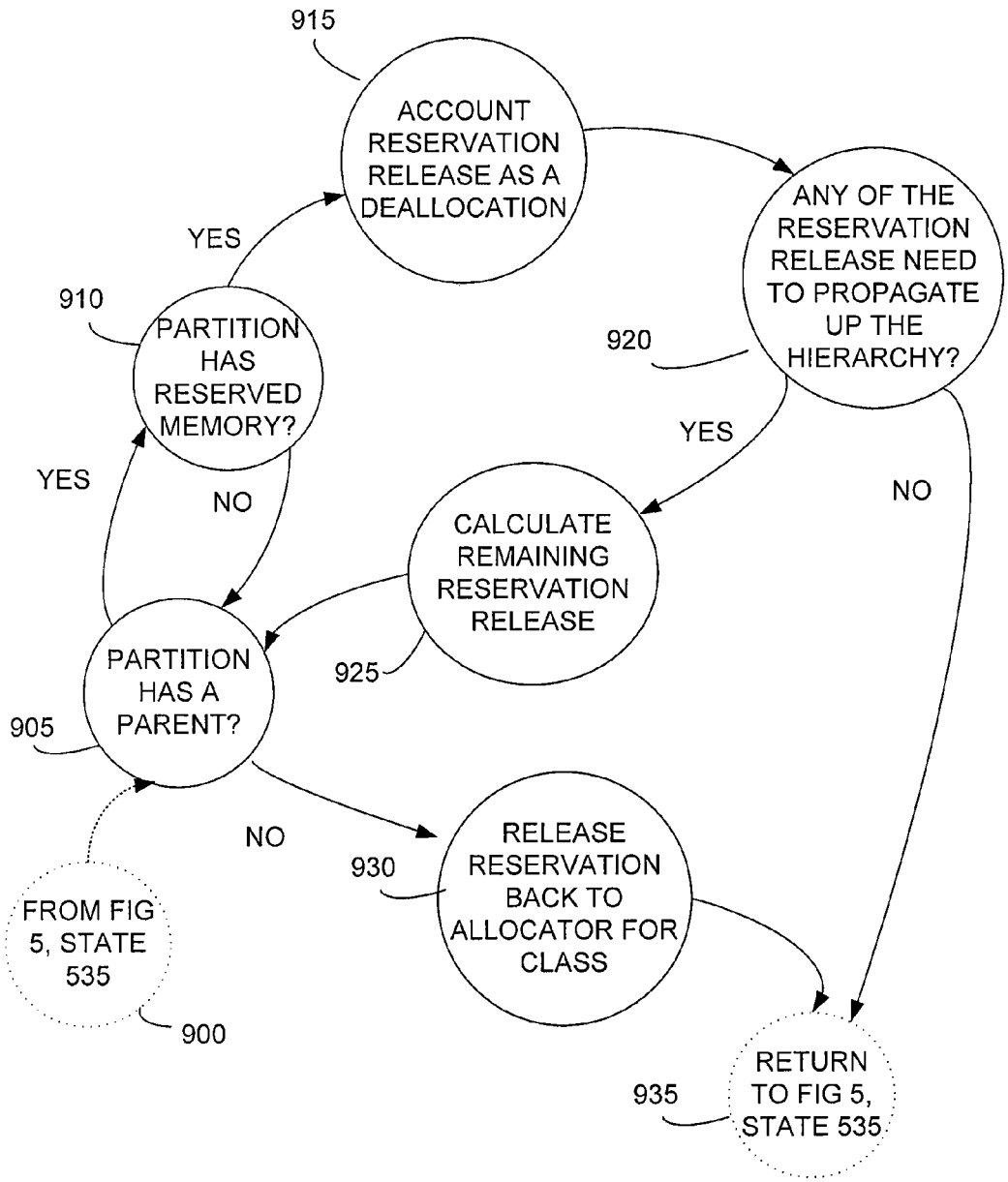
FIG. 9 is a process that releases a reservation of a memory partition.

If the parameters of the memory partition do not allow removal, then the request may fail at 525. If the parameters allow deletion, then the process determines whether the partition parameters include a reservation at 520. If they do not, then the partition may be removed at 530, and control may return to the "run process" state 400. If the partition parameters include a reservation, then the reservation may be released to the partition hierarchy at 535, before the partition is destroyed at 530. FIG. 9 shows a process for releasing the reservation to the partition hierarchy.

Figure 6:
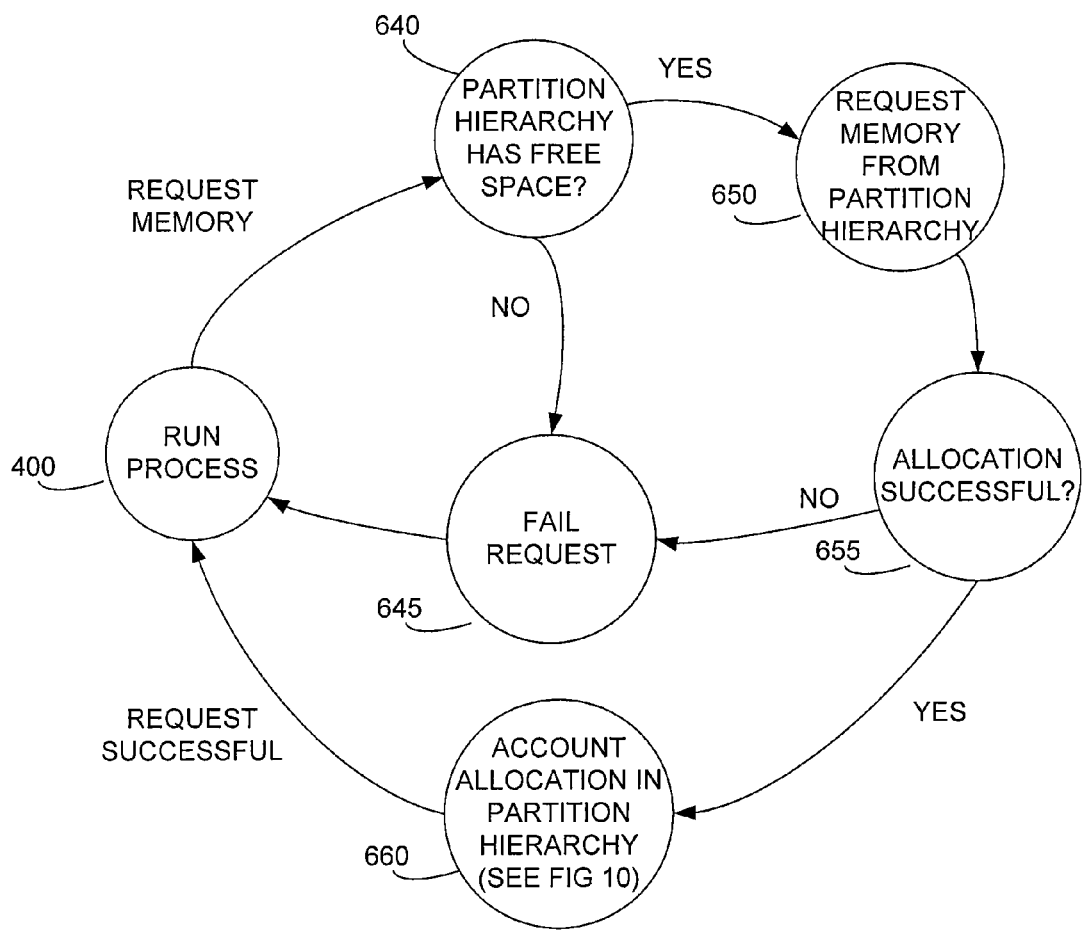
FIG. 6 is a process that requests memory of a memory partition.

FIG. 6 is a process for allocating memory partitions at runtime. When the process 400 requests memory, it determines whether the partition hierarchy has free space at 640. If memory is not available, then the request may fail and process control may pass to 645. The failure may be reported to a user and/or a further attempt to fulfill the request again may be initiated automatically. If the memory is available, the memory is requested from the memory allocator at 650. This request to the memory allocator 210 may include parameters such as the amount of the allocation request that should be accounted to a previously established reservation, and which portion should be accounted to unreserved memory. If memory allocation is successful at 655, then the memory may be accounted for at 660 and control may return to the requesting process at 400 to continue processing. If the allocation is not successful, then the request may fail and 645, and a failure notification may be issued before returning control to the requesting process at 400.

Figure 7:
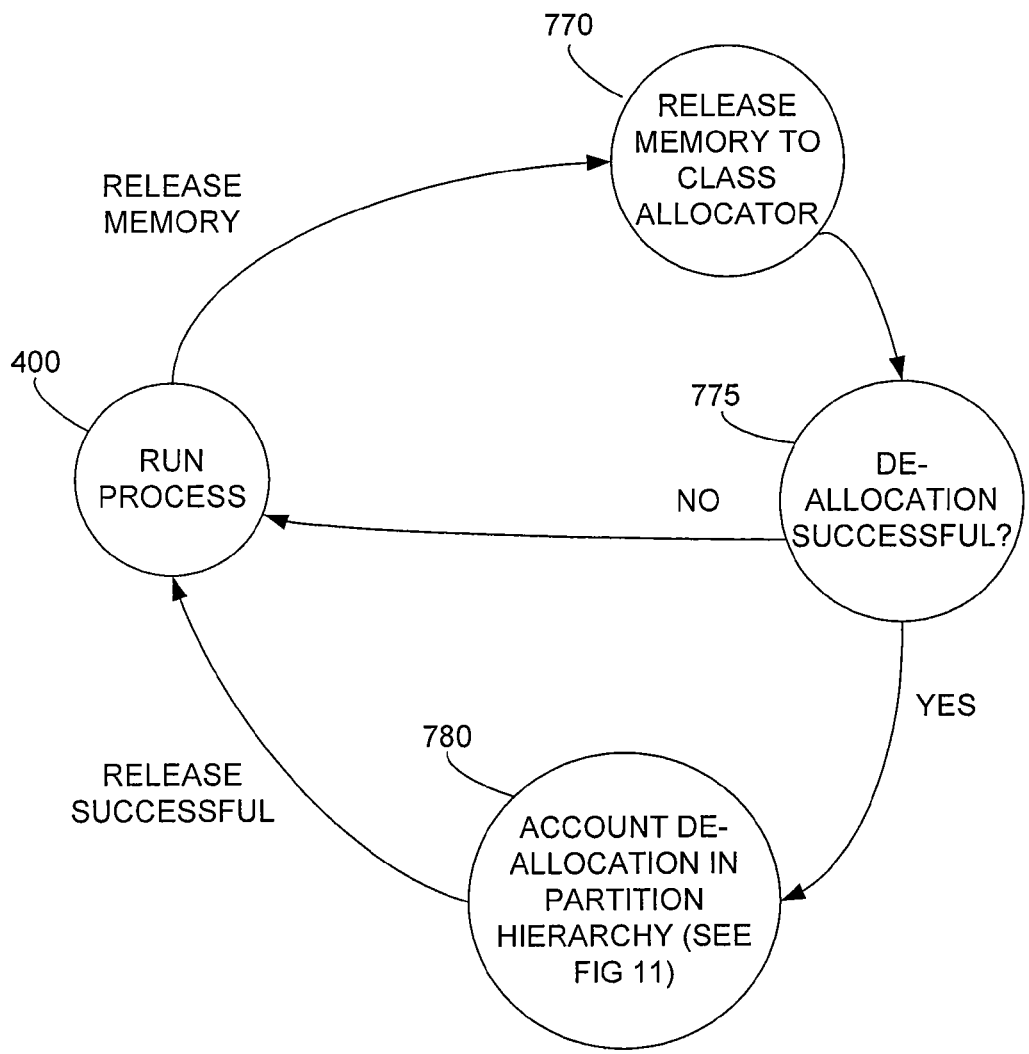
FIG. 7 is a process that releases memory of a memory partition.

FIG. 7 shows a process for the elected or automatic release of memory from a memory partition. When memory is no longer required, the process 400 may issue a memory release request at 770. If the process determines at 775 that the memory release was successful, then the memory release may be accounted for at 780 so that the released memory will become available for other processes. If the memory release instruction has insufficient permissions, or otherwise has bad parameters, the release may be unsuccessful at 775 and that memory remains accounted for as in-use.

Figure 8:
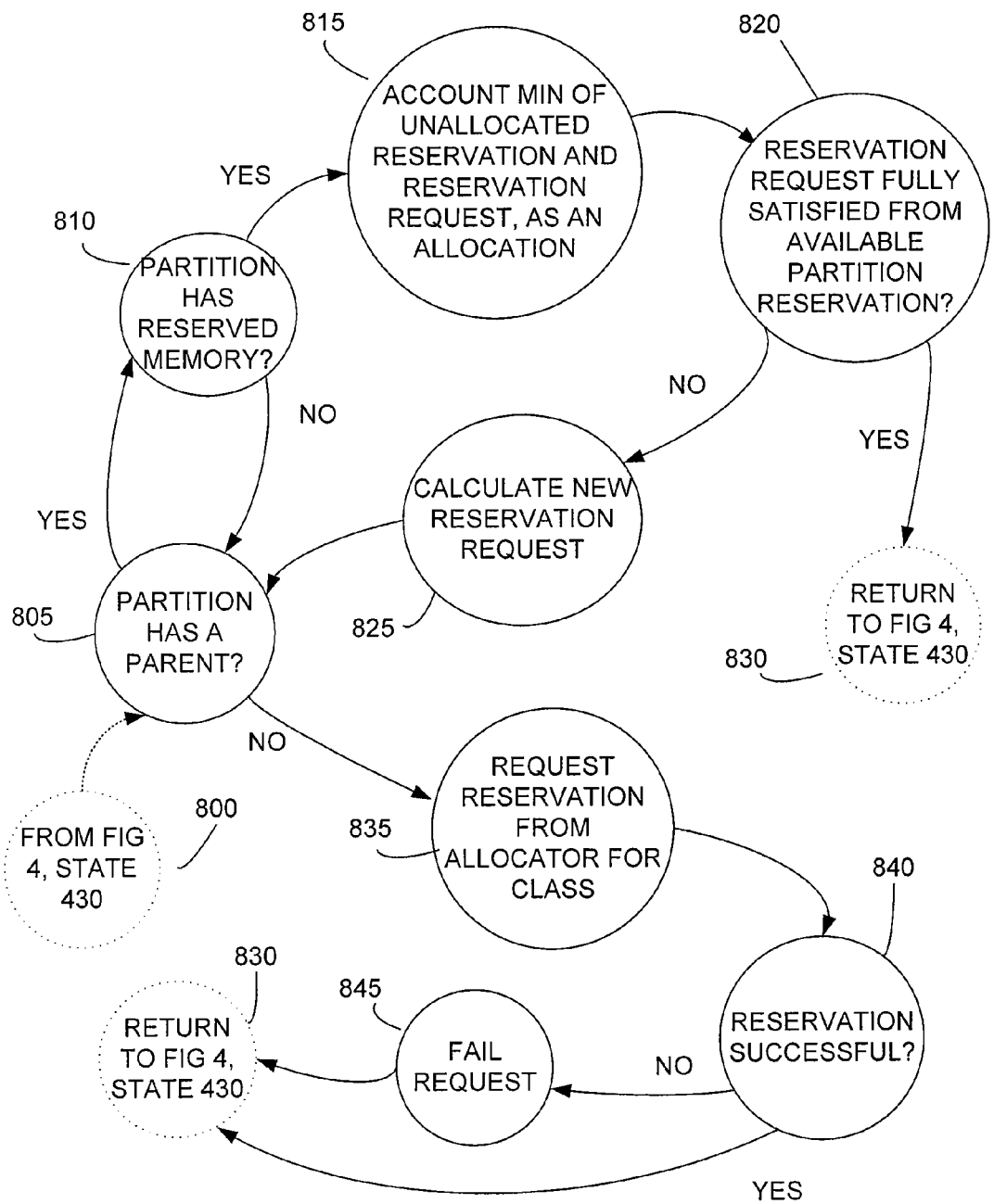
FIG. 8 is a process that requests a reservation for a memory partition.

FIG. 8 shows a process for reserving memory in a memory partition hierarchy. At 805, the determines whether the requested memory partition has a parent. If it does, then a query is made at 810 to determine whether the partition has reserved memory. If the partition has reserved memory, then the minimum of the unallocated reservation and the reservation request is accounted for as an allocation at 815. The process may determines at 820 whether the reservation request fully satisfies the available partition reservation. If so, then control may return to 430 of FIG. 4 (830 of FIG. 8). If not, then a new reservation request may be calculated at 825.

If process determines that the partition does not have a parent at 805, then the new reservation may be requested from the allocator for the class at 835. If the reservation is successful at 840, then control may return to 430 of FIG. 4. If the reservation is determined to be unsuccessful at 840, then a fail request may be issued at 845 and control returned to 430 of FIG. 4.

FIG. 9 is a process for deallocating a reservation from a memory partition hierarchy. At 905, the process determines whether the partition being deallocated has a parent memory partition. If it does, the process determines whether the memory partition has reserved memory at 910. If the memory partition has reserved memory, then the account reservation is released as a deallocation at 915. The process determines at 920 whether any portion of the reservation being released is to propagate through the partition hierarchy. This may occur when the original reservation (treated as an allocation in the hierarchy) was satisfied from the reservations of memory partitions higher up in the partition hierarchy. If satisfied, then the remaining reservation to be released may be calculated at 925 and control may return to 905 for completion of the release. Otherwise, control may return to state 535 of FIG. 5 (state 935 of FIG. 9).

At 905, the process may determine that the partition does not have a parent. If the memory partition does not have a parent, then the reservation may be released to the memory allocator for the class at 930. Control may then return to 535 of FIG. 5 (935 FIG. 9).

Figure 10:
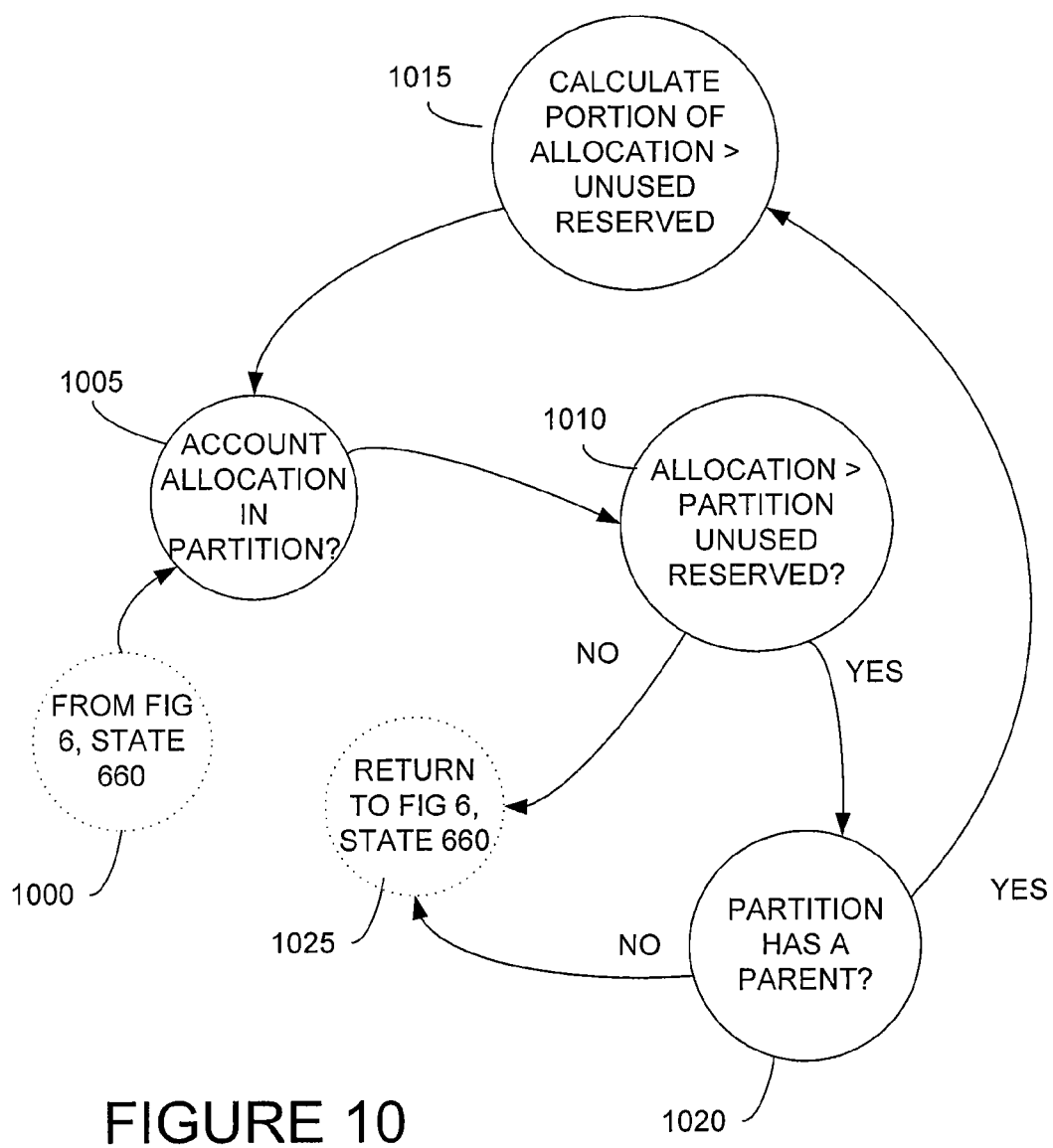
FIG. 10 is a process that accounts for an allocation of a memory partition.

FIG. 10 is a process for account allocation in a partition hierarchy. The process determines the amount of memory to allocate in the partition at 1005. At 1010, the process determines whether the allocation is greater than the unused reserved space for the partition. If not, then control may return to 660 of FIG. 6 (1025 of FIG. 10).

If the allocation is greater than the unused reserved space for the partition, then the process determines whether the partition has a parent at 1020. If the partition does not have a parent, then control may return to 660 of FIG. 6 (1025 of Figure normal 10). If the partition does have a parent, then the portion of the allocation that is greater than the unused reservation may be calculated at 1015, and control may return to 1005 so that the allocation may be accounted for. The process may loop through the memory partition hierarchy through 1020 to account for the allocation on all levels of the hierarchy.

Figure 11:
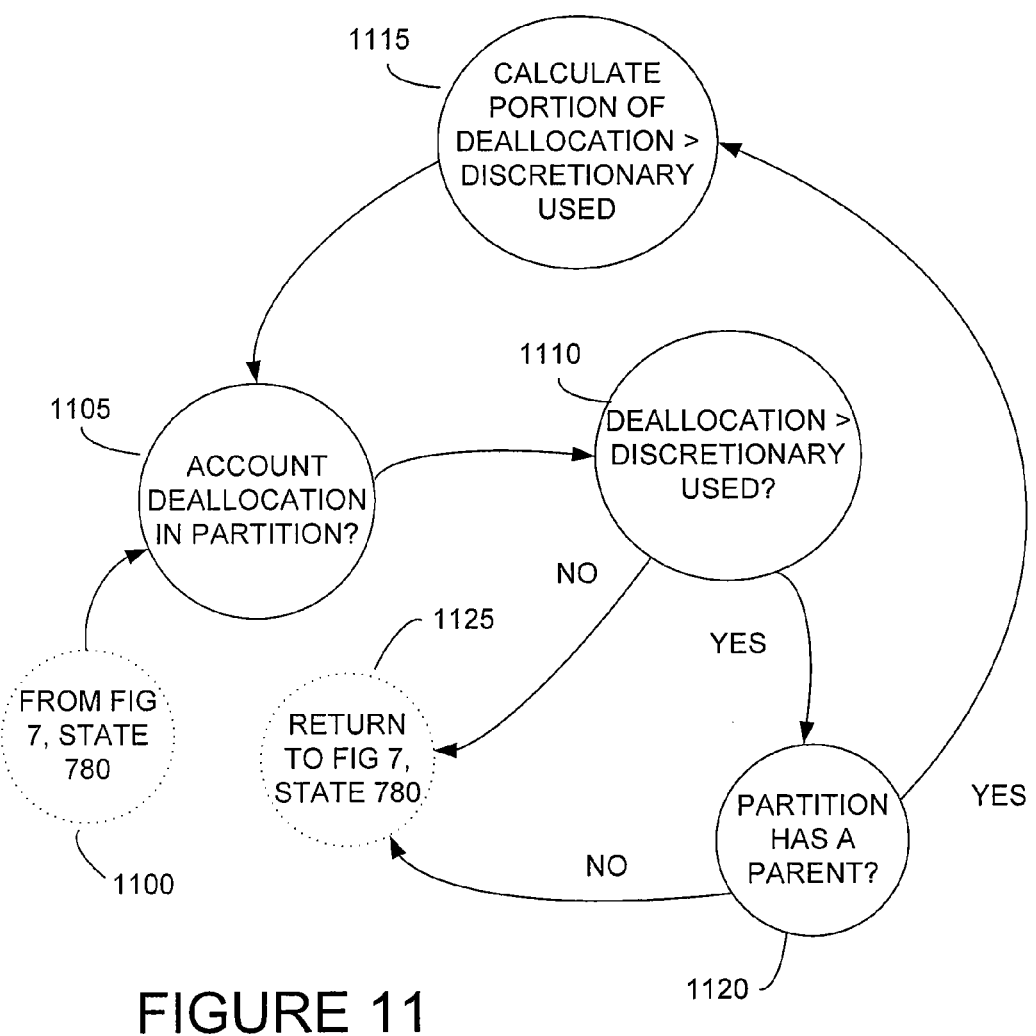
FIG. 11 is a process that accounts for a deallocation of a memory partition.

FIG. 11 is a process for deallocating memory from a memory partition. The process determines the amount of memory to deallocate from the partition at 1105. At 1110, the process determines whether the deallocation is greater than the discretionary amount of memory used for the memory partition. If not, then control may return to 780 of FIG. 7 (1125 of FIG. 1).

If the requested deallocation is greater than the discretionary unused space for the memory partition, then the process determines whether the partition has a parent at 1120. If the partition does not have a parent, then control may return to 780 of FIG. 7 (1125 of FIG. 11). If the memory partition does have a parent, then the process may calculate the portion of the deallocation that is greater than the discretionary unused reservation at 1015. Control may then return to 1105 so that the deallocation may be accounted for. The process may loop through the hierarchy through 1120 to account for the allocation on all levels of the memory partition hierarchy.

The methods and descriptions above may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to a device. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A processing system comprising:
   memory storage;
   memory resource partitioning code that is executable to allocate a memory partition when a process creates a memory object at runtime, wherein the memory partition is created for a single class of memory and the memory partition is associated with the memory storage, the memory partition having associated memory partition rules based on attributes established on a per memory class basis, that govern allocation of the memory storage associated with the memory partition, where the memory partition rules include a minimum size attribute and a maximum size attribute that indicate an amount of memory reserved for the memory partition and an amount of discretionary memory which is not guaranteed to be available for the memory partition, wherein a non-zero minimum size specifies an amount of memory reserved for use by the memory object created at runtime which is associated with the memory partition and the maximum size specifies an amount of memory that cannot be exceeded for use by the memory object created at runtime which is associated with the memory partition; and
   the process that is operable to create the memory object at run time and generate a request for use of an amount of memory storage;
   where the memory resource partitioning code responds to the process requesting use of the amount of memory storage by generating the memory partition for allocating memory in accordance with the memory partition rules.

2. The processing system of claim 1, where the memory resource partitioning code is adapted to generate a plurality of memory resource partitions.

3. The processing system of claim 2, where at least two of the plurality of memory resource partitions are arranged in a hierarchy comprising a parent memory partition and a child memory partition.

4. The processing system of claim 3, where the child memory partition has memory partition attributes corresponding to memory partition attributes of the parent memory partition.

5. The processing system of claim 1, where the memory resource partitioning code is adapted to generate a plurality of memory partition types.

6. The processing system of claim 5, where the plurality of memory partition types comprises an open memory partition type having a minimum size memory allocation equal to zero and a maximum size memory allocation that is not constrained by the open memory partition type.

7. The processing system of claim 5, where the plurality of memory partition types comprises a guaranteed memory partition type having a minimum size memory allocation equal to a predetermined value that is greater than zero and a maximum size memory allocation that is not constrained by the guaranteed memory partition type.

8. The processing system of claim 5, where the plurality of memory partition types comprises a restricted memory partition type having a minimum size memory allocation equal to zero and a maximum size memory allocation having a predetermined value corresponding to a maximum amount of memory storage that may be allocated.

9. The processing system of claim 5, where the plurality of memory partition types comprises a sandbox memory partition type having equal minimum size and maximum size memory allocation values.

10. The processing system of claim 1, where the process requesting use of the amount of the memory storage generates a memory object corresponding to a memory class, where the memory class is associated with a memory partition type having predetermined minimum size and maximum size attributes, and where the memory resource partitioning code generates a memory partition of the memory resource partition type when the process attempts to generate the memory object.

11. The processing system of claim 2, where at least two of the plurality of memory partitions are organized as a pseudo partition.

12. The processing system of claim 11, where the pseudo partition is collectively referenced by a group name.

13. The processing system of claim 1, wherein discretionary memory includes an amount of memory defined by the difference between the maximum memory allocation and the minimum memory allocation.

14. The processing system of claim 1, wherein different memory resource classes are partitioned separately and the process is allowed to be associated with more than one memory partition.

15. The processing system of claim 1, wherein the memory resource partitioning code arbitrates communications between a memory allocator and a physical memory allocator and intercepts the request for use of the amount of memory and processes the request before it is transferred to the physical memory.

16. A method for managing memory storage in a processing system comprising:
creating a memory object at run time by a process and requesting use of an amount of the memory storage;
generating a memory partition that represents a single class of memory in response to the request in accordance with memory partition rules based on attributes established on a per memory class basis corresponding to the memory partition, where the memory partition rules include a minimum size attribute and a maximum size attribute that indicate an amount of memory reserved for the memory partition and an amount of discretionary memory which is not guaranteed to be available for the memory partition, and a non-zero minimum size specifies an amount of memory reserved for use by the memory object created at run time which is associated with the partition and the maximum size specifies an amount of memory that cannot be exceeded for use by the memory object created at runtime which is associated with the memory partition; and
managing further memory requests from the process using the memory partition.

17. The method of claim 16, where the memory partition is generated in accordance with on one or more memory partition types.

18. The method of claim 17, where the one or more memory partition types comprises an open memory partition type having a minimum memory allocation equal to zero and a maximum memory allocation that is not constrained by the open memory partition type.

19. The method of claim 17, where the one or more memory partition types comprises a guaranteed memory partition type having a minimum memory allocation equal to a predetermined value that is greater than zero and a maximum memory allocation that is not constrained by the guaranteed memory partition type.

20. The method of claim 17, where the one or more memory partition types comprises a restricted memory partition type having a minimum memory allocation equal to zero and a maximum memory allocation having a predetermined value corresponding to a maximum amount of memory storage that may be allocated.

21. The method of claim 17, where the one or more memory partition types comprises a sandbox memory partition type having equal minimum and maximum memory allocation values.

* * * * *